E. D. BALL.
BEET HARVESTER.
APPLICATION FILED NOV. 22, 1913.
1,239,337.
Patented Sept. 4, 1917.
4 SHEETS—SHEET 2.
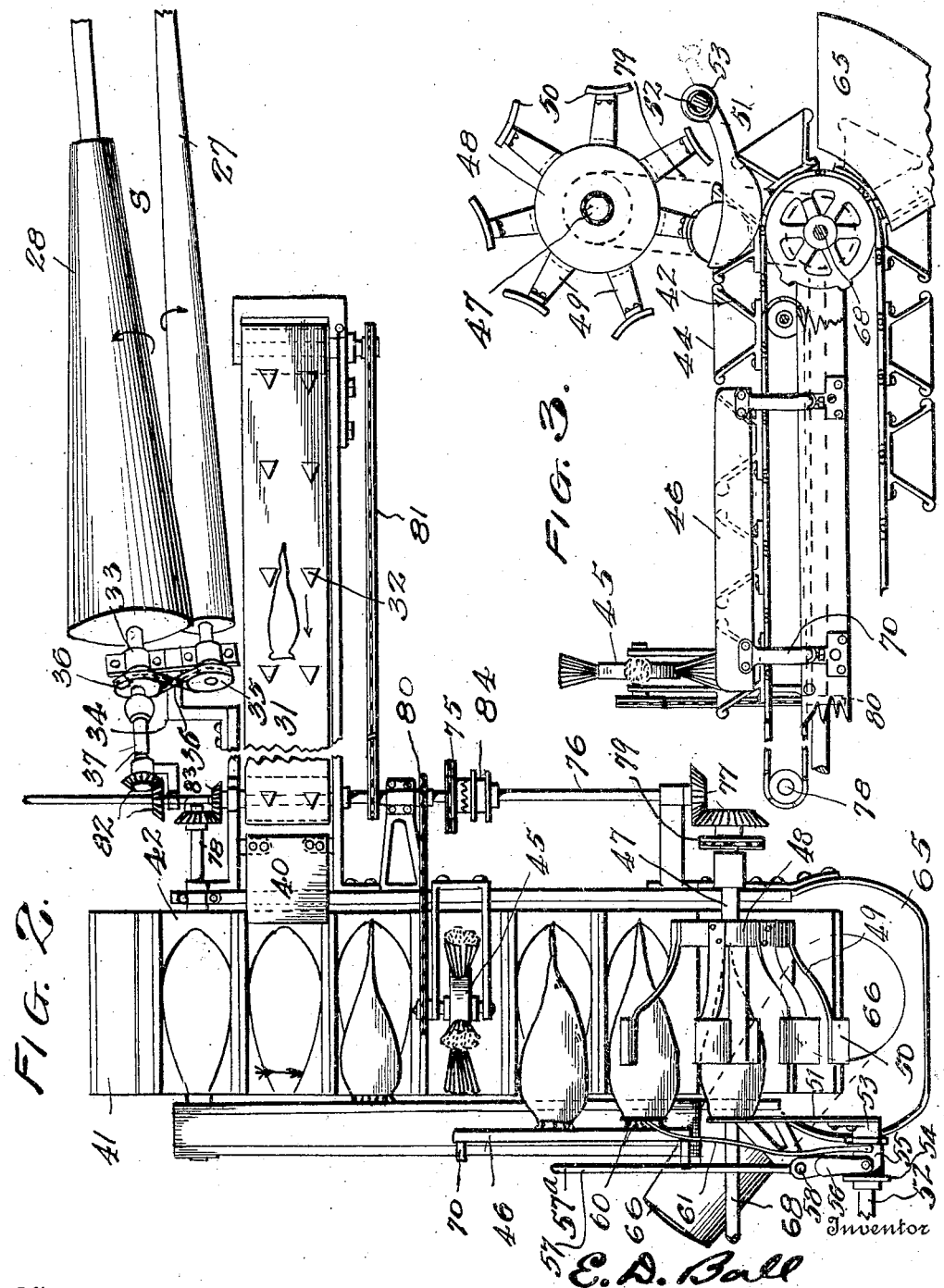
Witnesses
C. K. Davis
W. B. Brock
Inventor
E. D. Ball
By
Attorney

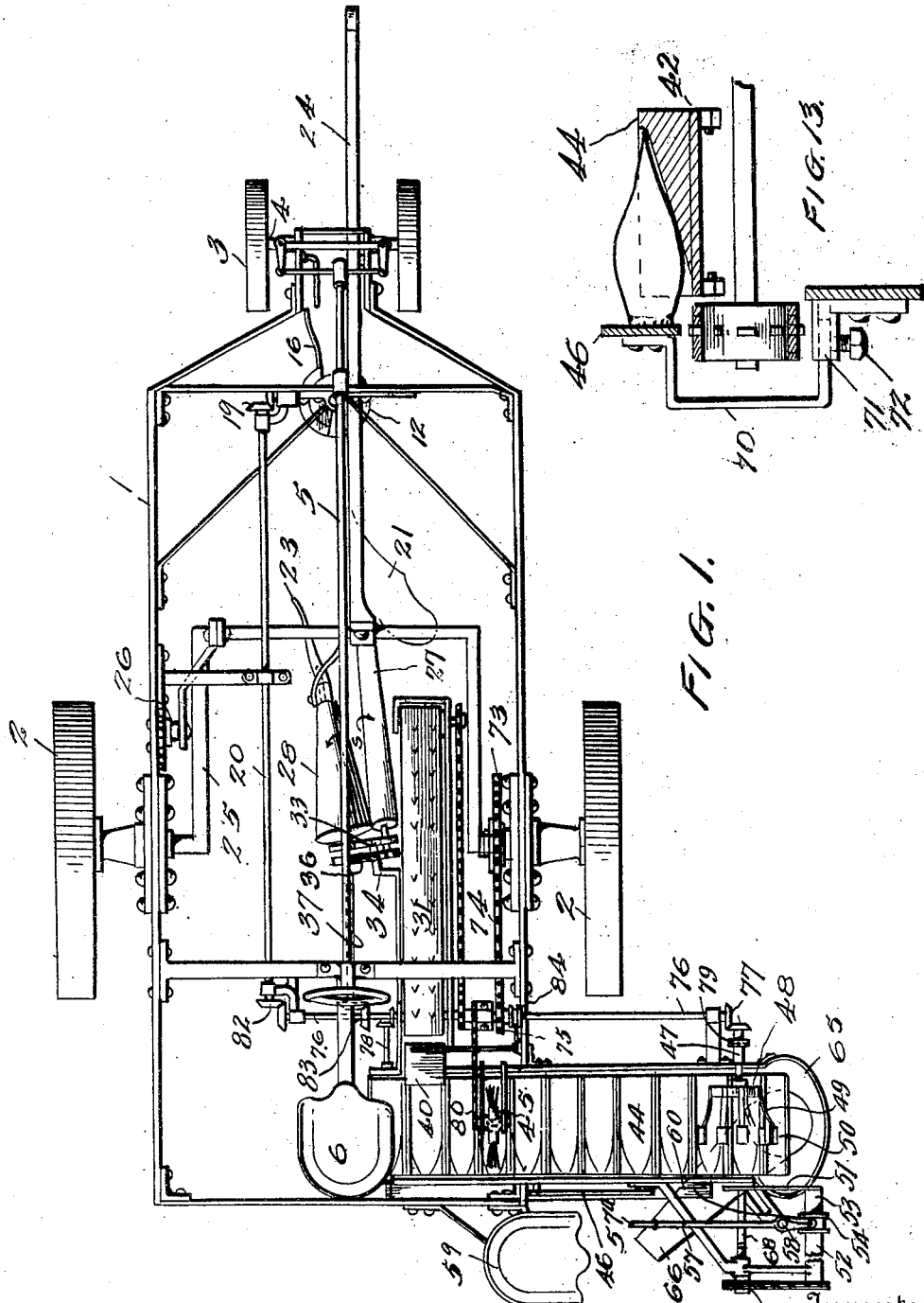

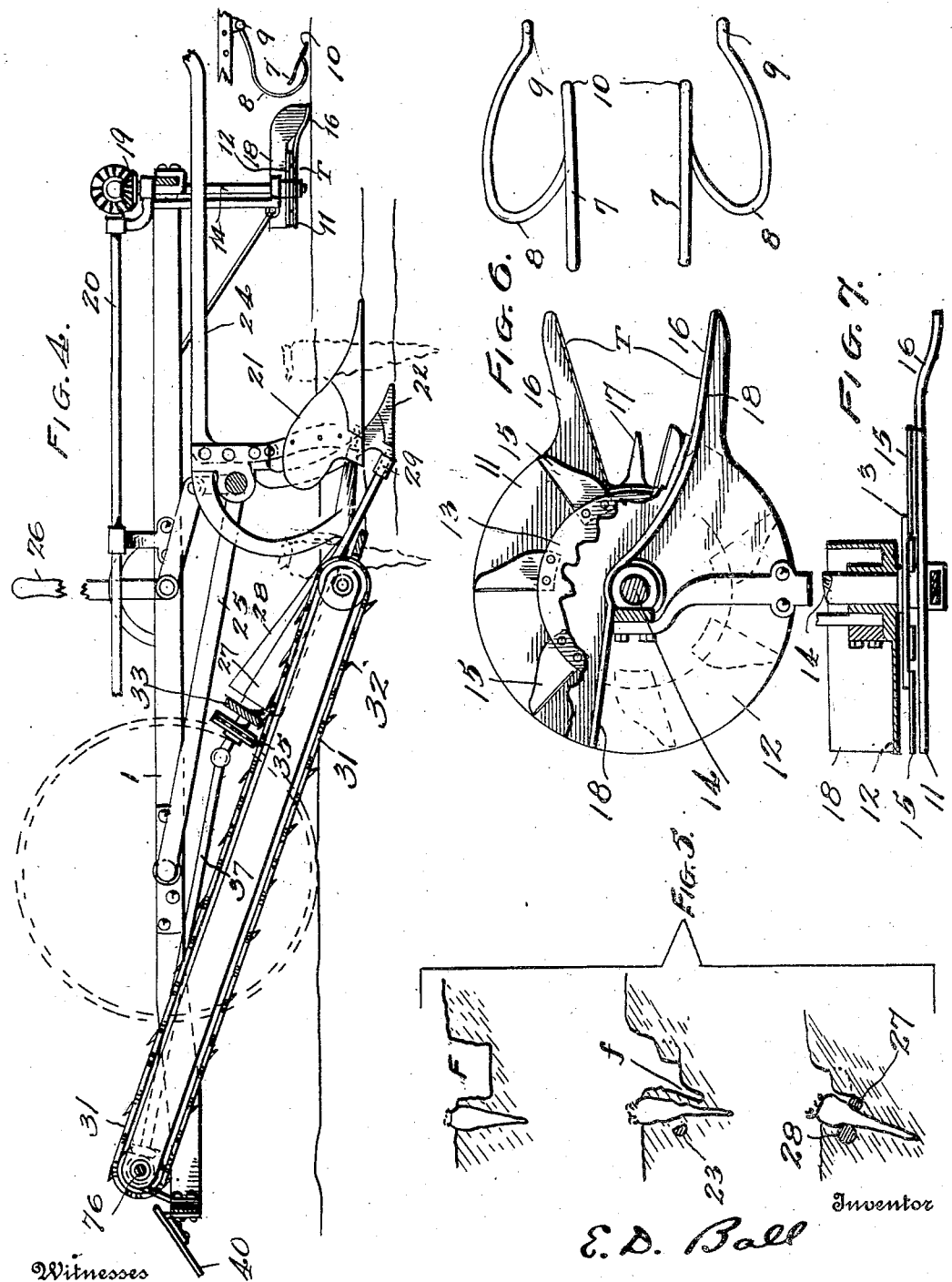

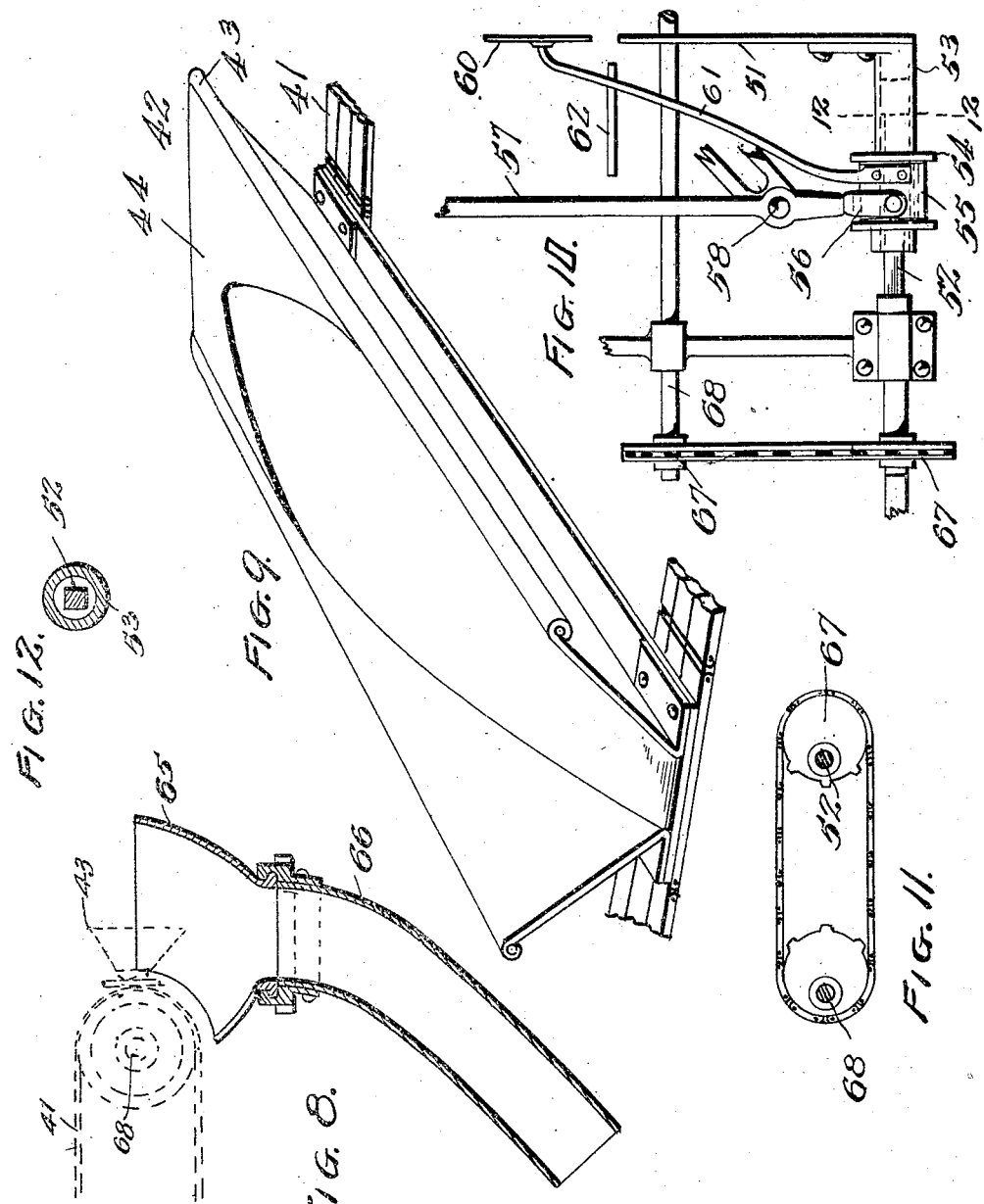

UNITED STATES PATENT OFFICE.

ELMER D. BALL, OF LOGAN, UTAH.

BEET-HARVESTER.

1,239,337.  Specification of Letters Patent.  Patented Sept. 4, 1917.

Application filed November 22, 1913. Serial No. 802,426.

*To all whom it may concern:*

Be it known that I, ELMER D. BALL, a citizen of the United States, residing at Logan, Utah, have invented certain new and useful Improvements in Beet-Harvesters, of which the following is a specification.

My invention relates to a machine especially adapted for digging and topping beets. Evidently, however, such a machine, or many of its features, may be advantageously used for harvesting other vegetables where the conditions are similar to those pertaining to beet-growing.

My invention provides means for removing foliage from the beets while they are in the ground; for digging beets; for conveying them to a cutter; and a cutting device or topper arbitrarily adjusted by an operator to cut off the top of each beet at the proper place.

The manually adjustable cutter, by means of which exactly the right amount of top may be cut from each beet, is a principal feature of the invention, the other features mentioned being, however, usually necessary in some form to coöperate with the cutting means.

A preferred form of digger comprises a plow to make a trench alongside the row, a sub-soil plow to deepen the trench, and a cam or finger to pull the beets into the trench. In a preferred form of the invention there is also provided to coöperate with this digger, a pulling or lifting device comprising rollers which grasp the beet between them and elevate it to a conveyer. Preferably also, these rollers are made of different relative sizes so that the varying surface velocities of the rollers cause the beets to be more effectively delivered to the conveyer.

I will now describe, with reference to the accompanying drawing, one exemplifying embodiment of the invention.

It is to be understood that the invention is capable of many different embodiments.

Figure 1 is a top plan of a machine embodying the invention.

Fig. 2 is an enlarged top plan of a part of the pulling rollers, the longitudinal conveyer, transverse conveyer, and the cutting or topping means.

Fig. 3 is a rear elevation of the topping mechanism.

Fig. 4 is a side elevation of a machine omitting the topping mechanism.

Fig. 5 is a diagram showing a cross-section of a row of beets, to illustrate the action of the digging devices.

Fig. 6 is a top view of the foliage-gathering and cutting means.

Fig. 7 is a vertical section of the rear part of Fig. 6.

Fig. 8 is a vertical section of the delivery means for depositing the cut beets on the ground in rows.

Fig. 9 is a detail of the transverse conveyer.

Fig. 10 is a top plan of a part of the topping mechanism.

Fig. 11 is a diagrammatic detail of driving means for the cutter.

Fig. 12 is a cross-section of the cutter-shaft, and

Fig. 13 is an enlarged section in the longitudinal plane of the machine of the transverse conveyer and beet guide.

Reference character 1 designates the main frame having wheels 2 suitable for carrying the machine in soft ground and for supplying driving power to the conveyers and other parts of the mechanism. At the front end of the frame are steering wheels 3, preferably mounted on stub-axles 4 and controlled by suitable steering mechanism 5, so that the machine may be steered accurately in relation to the row. This mechanism is usually regulated by the driver, for whom a seat 6 is provided at any convenient place on the machine.

Near the front end of the machine is carried the foliage cutter, designated in general by the character T. Just in front of this is a foliage lifting device, comprising two inclined rods or guides 7 carried by rearwardly and outwardly curved arms 8, these arms being so designed to avoid interference with the foliage of the beets. The upper ends of the arms are connected to a frame member as at 9, Fig. 4. The lower front ends 10 of guides 7 run under the beet foliage and lift it and direct it to a cutter. This comprises a bottom plate 11 and a top plate 12, suitably carried by the main frame. Between these plates revolves a cutter disk 13 mounted on vertical shaft 14. On the periphery of the disk are a plurality of cutter blades 15. The bottom plate 11 is provided at the front with extended, rearwardly-convergent guides 16, and the guideway provided between these guides extends back substantially to the periphery of the disk 11. The disk may also be provided with a prong 17 at the center of the guideway. The leaf stems pass between the guides 16 and are cut between the blades or knives 15 and the edges of the prong 17 and one of the guides 16. The cut foliage is thrown off to one side by a vertical guide 18 provided upon top plate 12 and extending to a point behind shaft 14. Shaft 14 may be driven in various ways, exemplifying means here shown consisting of bevel gears 19, longitudinal shaft 20 and suitable connections. Shaft 20 is suitably connected to some other driving part of the machine.

Behind the leaf cutter is a digger, the character of which may be varied greatly, but in a preferred embodiment this comprises a main plow 21 which digs the main furrow F shown in the diagram (Fig. 5). Below this is a sub-soiler 22 which digs a second, deeper furrow $f$ (Fig. 5). A cam or finger 23 is also provided, which runs in the earth to the left of the beet row, as shown in Fig. 5, and is arranged at such an angle to the path of travel of the machine, as shown in Fig. 1, that the beets are forced over into the furrow or channel, and into the path of the lifting rollers, the front ends of which are shown in engagement with the beet at the bottom of Fig. 5.

The support for the digging means may be varied greatly but in the present embodiment it comprises a beam structure 24 carrying the plow, subsoiler and cam. The beam structure is pivotally connected to the front end of a brace or strut rod 25, and the digger structure may be raised or lowered, as desired, by means of lever 26 and suitable linkage. The team or tractor are to be hitched to the front end of beam 24.

The lifting means comprise a small roller 27 and a large roller 28 having substantially parallel axes. These rollers are preferably in the form of cones, enlarging toward the rear. The front end or shaft of roller 27 is mounted in a socket 29 at the rear of the sub-soiler 22 and the forward end or shaft of roller 28 is mounted in a socket at the rear of cam 23. These socket mountings have suitable play to permit necessary freedom of motion of the digger structure. The large roller 28 lies more or less above the small roller, as best seen in Fig. 2, and there is provided between the rollers a rearwardly-converging space $s$. The beets are pulled into the furrow by cam 23, as shown by the middle diagram, Fig. 5, passing between the front ends of the rollers, as shown in the bottom diagram, Fig. 5. The rollers are rotated as shown by the arrows, and thus grip and pull the beets from the ground. The larger diameter of roller 28 also causes the beets to be thrown toward the right or over the small roller 27, head first, and the heads are thus delivered upon a longitudinal conveyer 31. This conveyer has longitudinally arranged rows of spikes or guides 32 which swing the beets around until they lie head first upon the conveyer in the direction of its motion, as shown by the arrow.

The rear ends of the roller shafts are supported in bearings 33 carried by roller frame member 34, and the rollers are driven by suitable sprockets or pulleys 35 and suitable chain or belt 36 connected by shaft 37 and suitable gearing with other driving parts of the machine.

The longitudinal conveyer 31 delivers the beets to a guide or slideway 40, from which they pass to transverse conveyer 41. This transverse conveyer carries a plurality of pockets 42 which conveniently consist of metal troughs 43 in which are placed beveled filler blocks 44 to properly support the beets in the pockets with due regard to their general conical shape. As the pockets carrying the beets move in the direction of the arrow (Fig. 2) they pass under a brush 45 rotated at suitable speed in relation to the movement of the belt, so that the brush bristles push the head of each beet against the guide-piece 46. Near the inner end of the belt is a clamping device comprising a shaft 47 provided with a hub 48, spring-arms 49 and clamping fingers 50. Shaft 47 is rotated at such speed that as each pocket comes beneath it one of the clamping fingers 50 is pressed upon the beet and holds it firmly in the pocket while it is being cut. Adjacent to the clamping device is the cutter, consisting in this embodiment of a knife 51 carried by shaft 52. The shaft may be splined or squared, as shown in the drawing, and the knife is carried on a hub 53 suitably engaged with the shaft so that the knife may slide longitudinally on the shaft but revolves therewith. To adjust the knife, its hub is provided with an annular groove 54, in which fits a collar 55. To this collar is connected a fork 56 carried by a lever 57 fulcrumed at 58 to the frame member. This lever terminates in a handle 57$^a$ conveniently located to be grasped by an operator sitting in seat 59. This seat, as shown in Fig. 1, is located so that the line of beets carried by the transverse conveyer is easily seen by the operator, and as each beet approaches the path of the knife and is clamped for cutting, the operator, by manipulating the handle, shifts the knife to cut off the proper portion of the top of the beet. Since these beets vary greatly as to the amount of fibrous top, it is impracticable to properly cut them by automatic means or means controlled by the machine itself, and I, therefore, provide means controlled arbitrarily by an operator for adjusting the cutting device in relation to each beet to properly cut it.

The knife shaft revolves at such speed that the knife passes each pocket 42 as it arrives opposite the cutting point in the travel of the conveyer.

To facilitate proper cutting, a knife-guide 60 may be provided, consisting of a pointer or guiding device of any suitable kind moving in accordance with the adjusting movement of the knife. For example, this guide may be carried by an arm 61 connected to collar 55 and supported by rail 62 located on any suitable frame member. This guide being in advance of the knife, as shown in Fig. 2, enables the operator to set the knife exactly right for the beet in advance of the cutting action.

The cut tops drop to the ground and the beets when released from the clamping device fall into a hopper 65 at the bottom of which is a swiveled spout 66. By swinging this spout on its swivel the cut beets may be dropped in rows so that the beets from several planted rows may be dropped in a single finished row for easy loading into wagons.

It may be desirable to speed up the knife as it passes through the beet and for this purpose the knife shaft may be driven by sprockets 67 mounted, respectively, on the knife shaft 52 and driving shaft 68, these sprockets being eccentric to their shafts, as shown, so that the knife moves fastest as it passes through the beet.

The guide or abutment 46 may be adjusted to regulate the position of the beets before they approach the knife, by mounting its supporting irons 70 (Fig. 13) in sockets 71, securing them by set screws 72.

The transverse conveyer, as shown, extends toward the right-hand side of the machine. Evidently, the position and direction of running of this conveyer could be reversed so that it would take beets from the longitudinal carrier at the right and deliver them toward the left, and in this case the transverse conveyer would not have so great an overhang as is shown in Fig. 1, and the balance of the machine might be improved in some cases, although the machine when properly constructed and balanced will operate satisfactorily as shown in Fig. 1.

Evidently, driving means for all of the moving parts described may be variously arranged, but I will now briefly describe one suitable arrangement of driving mechanism for all of the parts.

One of the ground wheels 2 is provided with a sprocket 73, which, by means of chain 74, drives sprocket 75 on shaft 76. This transverse shaft drives, by means of beveled gears 77, shaft 68 previously mentioned, from which the knife shaft is driven. Shaft 68 may also support one end of the transverse conveyer while the other is carried on a shaft 78. Shaft 47 of the clamping device may be driven from shaft 68 by sprockets and a chain 79. The shaft of brush 45 is driven from shaft 76 by suitable sprockets and chain 80. The rear end of longitudinal conveyer 31 may be supported by shaft 76, and in cases where it is desired to drive this conveyer faster or slower than the shaft speed this may be done by connecting the shaft at the forward end of the conveyer with shaft 76 by suitable sprockets and chain 81. Shaft 76 also drives by means of beveled gears 82 shaft 37 of the roller mechanism previously described. In some cases it may be desirable to drive both ends, or only the left hand end, of the transverse conveyer 41, and in such cases its shaft 78 may be connected to shaft 76 by beveled gears 83.

All of the mechanism may be disconnected by means of a clutch 84 on shaft 76, by means of which sprocket 75 is connected and disconnected.

I claim:—

1. In a harvester for beets or the like, the combination of a cutter shaft, a cutter thereon, means for manually adjusting the cutter upon its shaft, a guide positioned in advance of the cutter and movable therewith to indicate cutting position, and a carrier for presenting beets successively to the cutter.

2. In a harvester for beets and the like, the combination of a conveyer to present a series of separate vegetables to be topped, top-cutting means mounted to be freely moved laterally in respect to the conveyer to position said cutting means to top each vegetable in accordance with its peculiarities, and hand controlling means for moving said cutting means rapidly to different cutting positions.

3. In a harvesting machine for beets and the like, the combination of a longitudinal conveyer whereon beets are deposited longitudinally and head-first, a transverse conveyer having pockets in which beets are deposited singly by the longitudinal conveyer, a guide alongside the transverse conveyer, means for moving the heads of the beets against the guide, clamping means acting on the beets in cutting position, a cutter to cut the beets singly while clamped, and means for moving the cutter rapidly from side to side to properly top each beet as it is presented to the cutter in accordance with the amount of top thereon.

4. In a harvesting machine for beets and the like, the combination of a longitudinal conveyer whereon beets are deposited longitudinally and head-first, a transverse conveyer having pockets in which the beets are deposited singly by the longitudinal conveyer, a guide alongside the transverse conveyer, a rotary positioning device engaging the beets in the pockets to move them into engagement with the guide, a rotary clamping device having yieldable clamps to engage the beets in the pockets when in cutting position, a cutter, and manual means for adjusting the cutter endwise in relation to the beets to remove the proper amount of top from each.

5. In a harvesting machine for beets and the like, the combination of a longitudinal conveyer receiving beets longitudinally and head-first, a topper, means for taking beets from the longitudinal conveyer and presenting them to the topper singly for topping without interference by other of the beets, and means for freely and quickly moving the topper endwise in respect to the beets as they are presented to a cutter to remove the proper amount of top from each.

6. In a harvesting machine for beets and the like, the combination of a longitudinal conveyer whereon beets are deposited longitudinally and head-first, a transverse conveyer having pockets in which beets are deposited singly by the longitudinal conveyer, a guide alongside the transverse conveyer, means for moving the heads of the beets against the guide, clamping means acting on the beets in cutting position, a cutter to cut the beets singly while clamped, means for adjusting the cutter to properly top each beet in accordance with the amount of top thereon, and a pointer connected to move with the cutter to indicate the place for cutting the beet.

7. In a harvesting machine for beets and the like, the combination of a longitudinal conveyer receiving beets longitudinally and head-first, a topper, means for taking beets from the longitudinal conveyer and presenting them to the topper singly for topping without interference by other of the beets, means for adjusting the topper endwise in respect to the beets to remove the proper amount of top from each, and a pointer connected to move with the cutter to indicate the place for cutting the beet.

ELMER D. BALL.

Witnesses:
M. A. WOOD,
H. I. RATHVON.

Copies of this patent may be obtained for five cents each, by addressing the "Commissioner of Patents, Washington, D. C."